United States Patent
Srivastava

(10) Patent No.: US 12,307,099 B2
(45) Date of Patent: May 20, 2025

(54) METHOD AND SYSTEM FOR TAPE STORAGE UTILIZATION

(71) Applicant: Kyndryl, Inc., New York, NY (US)

(72) Inventor: Sanjay Srivastava, Ghaziabad (IN)

(73) Assignee: Kyndryl, Inc., New York, NY (US)

( * ) Notice: Subject to any disclaimer, the term of this patent is extended or adjusted under 35 U.S.C. 154(b) by 524 days.

(21) Appl. No.: 17/568,937

(22) Filed: Jan. 5, 2022

(65) Prior Publication Data

US 2023/0214128 A1 Jul. 6, 2023

(51) Int. Cl.
*G06F 3/06* (2006.01)
*G06F 16/18* (2019.01)
*G06F 16/182* (2019.01)
*G06F 16/23* (2019.01)

(52) U.S. Cl.
CPC ............ *G06F 3/0619* (2013.01); *G06F 3/064* (2013.01); *G06F 16/1815* (2019.01); *G06F 16/1834* (2019.01); *G06F 16/184* (2019.01); *G06F 16/2365* (2019.01)

(58) Field of Classification Search
CPC ...... G06F 3/0619; G06F 3/064; G06F 3/0659; G06F 3/067; G06F 16/1815; G06F 16/184; G06F 16/1834; G06F 16/2365
See application file for complete search history.

(56) References Cited

U.S. PATENT DOCUMENTS

| | | | |
|---|---|---|---|
| 7,797,395 B1 | 9/2010 | Thakur et al. | |
| 9,697,571 B2 | 7/2017 | Seeger, Jr. et al. | |
| 10,621,164 B1 * | 4/2020 | Kain | G06F 16/215 |
| 10,846,372 B1 * | 11/2020 | Jayachandran | H04L 9/3239 |
| 11,295,402 B2 * | 4/2022 | Purushothaman | G06Q 10/063 |
| 11,321,298 B1 * | 5/2022 | Ramakrishna | G06F 16/2308 |
| 11,556,874 B2 * | 1/2023 | Deshpande | G06Q 10/06315 |
| 2014/0180915 A1 | 6/2014 | Montulli et al. | |
| 2019/0080308 A1 * | 3/2019 | Sheikh | G06Q 30/08 |
| 2019/0349426 A1 * | 11/2019 | Smith | H04L 9/3239 |
| 2020/0021446 A1 * | 1/2020 | Roennow | H04L 9/0819 |
| 2020/0250683 A1 * | 8/2020 | Padmanabhan | G06Q 20/38215 |
| 2020/0302563 A1 * | 9/2020 | Golway | G06Q 50/188 |
| 2020/0326871 A1 | 10/2020 | Wu et al. | |
| 2020/0336297 A1 * | 10/2020 | Zhuo | G06F 16/2379 |
| 2020/0394154 A1 * | 12/2020 | Blackshear | H04L 9/0637 |
| 2020/0394648 A1 * | 12/2020 | Blackshear | H04L 63/12 |
| 2020/0394709 A1 * | 12/2020 | Cella | G06Q 20/405 |
| 2021/0049065 A1 * | 2/2021 | Lu | H04L 9/3236 |
| 2021/0073754 A1 * | 3/2021 | Lingala | G06Q 20/382 |
| 2021/0165686 A1 * | 6/2021 | Yang | G06Q 20/02 |
| 2021/0342836 A1 * | 11/2021 | Cella | H04L 9/3239 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Mark E Hershley
(74) *Attorney, Agent, or Firm* — Erik Swanson; Andrew M. Calderon; Calderon Safran & Wright P.C.

(57) ABSTRACT

A method includes detecting, by a computing device, a plurality of transactions on one or more data storage system. The method further includes sequentially recording, by the computing device, the plurality of transactions occurring on the one or more data storage system in sequentially linked and immutable blocks.

19 Claims, 5 Drawing Sheets

(56) References Cited

U.S. PATENT DOCUMENTS

| | | | |
|---|---|---|---|
| 2022/0057519 A1* | 2/2022 | Goldstein | G01S 17/88 |
| 2022/0156737 A1* | 5/2022 | Wright | G06Q 20/405 |
| 2022/0198562 A1* | 6/2022 | Cella | G06Q 40/04 |
| 2022/0366494 A1* | 11/2022 | Cella | H04L 9/50 |
| 2023/0015535 A1* | 1/2023 | Smeltzer | G06Q 30/08 |
| 2023/0118406 A1* | 4/2023 | Antonio | G06F 21/6218 |
| | | | 705/27.1 |
| 2023/0124459 A1* | 4/2023 | Choi | G06Q 30/0222 |
| | | | 705/14.23 |
| 2023/0214128 A1* | 7/2023 | Srivastava | G06F 3/061 |
| | | | 711/162 |
| 2023/0229986 A1* | 7/2023 | Cami | G06Q 10/06312 |
| | | | 705/7.15 |
| 2023/0245247 A1* | 8/2023 | Xiong | G06Q 20/123 |
| | | | 705/69 |

OTHER PUBLICATIONS

Javed et al., "Blockchain-Based Secure Data Storage for Distributed Vehicular Networks", MDPI Applied Sciences, 2011, 22 pages.

* cited by examiner

METHOD AND SYSTEM FOR TAPE STORAGE UTILIZATION

BACKGROUND

Aspects of the present invention relate generally to data storage utilization and, more particularly, to a structured arrangement of storage utilization and record keeping of data in storage systems, e.g., server utilization.

In cloud and other storage applications, customer data is stored and retained on servers based on backup policies and agreements with the customer. This data may include pictures, videos, email correspondences and/or other documents. The storage management can be attended through the use of certain management tools, which provide backup and restore services of the data as needed. On the other hand, the storage data can be reported through reporting tools, which reports are provided to the service provider for review to, for example, prepare invoices to the customer.

In cloud and other storage applications, large amounts of data may be stored unnecessarily. For example, hundreds of terabytes of data may be stored even when the server is decommissioned based on a customer request. In such a case, for example, the storage retention does not delete the files along with the decommissioned server due to non-clarity in the decommission request, contractual offerings or due to automatic internal retention maturity policies, etc. In some instances, the backup policy may also be changed per the customer request and the new configuration cannot be adjusted within existing configuration files due to updates in technology or due to the use of unique individual configuration files for such purpose.

In data retention schemes, the service provider can rename existing data files that are to be saved to, e.g., .OLD, and then create a new data file with an existing name. For storage of such .OLD configuration files, the retention of such stored documents may in the gigabytes to terabytes of data. However, the storage reporting tools may not be able to detect such .OLD configuration files. For example, the configuration files may include inactive links, they may have manual scripts that cannot read .OLD configuration files, or there is a missed naming convention, etc.

SUMMARY

In a first aspect of the invention, there is a computer-implemented method including: detecting, by a computing device, a plurality of transactions on one or more data storage system; and sequentially recording, by the computing device, the plurality of transactions occurring on the one or more data storage system in sequentially linked and immutable blocks.

In another aspect of the invention, there is a computer program product including one or more computer readable storage media having program instructions collectively stored on the one or more computer readable storage media. The program instructions are executable to: receive a request to make a transaction associated with data on one or more data storage system; record the request in an immutable block; make a change to the one or more data storage system based on the requested transaction; record the change in a second immutable block that is linked in sequentially to the immutable block; and provide notification of the recorded change to a third party.

In another aspect of the invention, there is system including a processor, a computer readable memory, one or more computer readable storage media, and program instructions collectively stored on the one or more computer readable storage media. The program instructions are executable to: record changes in immutable, sequentially linked blocks associated with a plurality of data storage systems, each of the immutable, sequentially linked blocks include a single transaction that is to take place on the plurality of data storage systems in a sequence in which they take place and are requested; and provide notification of the recorded change including freed up resources on the on the plurality of data storage systems due to the changes.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
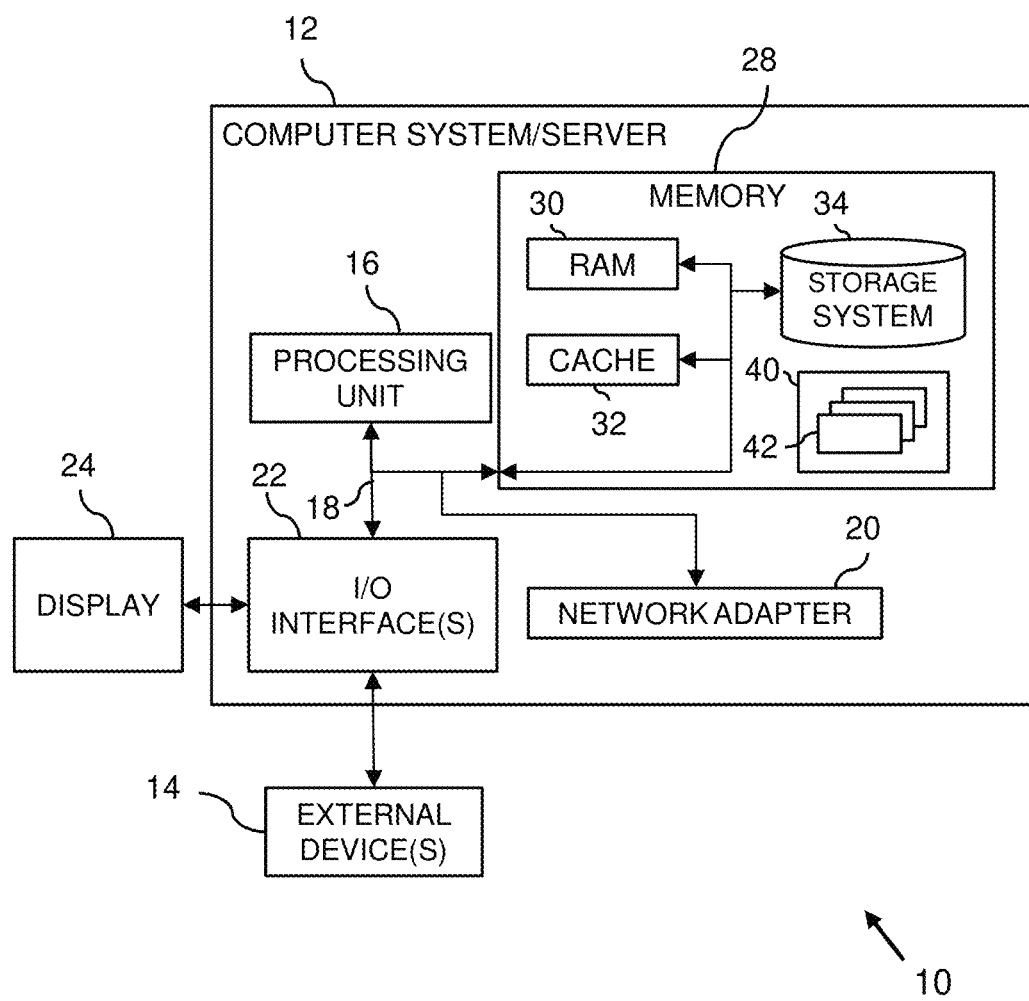
FIG. 1 depicts a cloud computing node according to an embodiment of the present invention.

Aspects of the present invention relate generally to data storage utilization and, more particularly, to a structured arrangement of storage utilization and record keeping of data in storage systems, e.g., server utilization. According to more specific aspects of the invention, the method and system described herein facilitate a structured arrangement of all storage utilization, record keeping, and invoicing of the customer for storage utilization using, for example, a smart contract with available storage and configurable items in place. In this manner, implementations of the invention provide an efficient manner of maintaining and tracking of data which is to be stored, even when there are changes to backup policies, customer contacts and/or requests, and/or decommissioning of servers, etc.

In aspects of the present invention, untagged documents that remain in storage can be maintained and tracked even when a server is decommissioned, backup policy changes, and/or changes have been made to nomenclatures of the stored documents, e.g., configuration files. For example, in an aspect of the present invention, the method and system detect when a storage block (e.g., file, data base, log, etc.) is uncoupled due to a full name change as MACD changes are carried out, a copy of the data is made for a backout, or a data block is renamed such that the tag that earlier enabled these to be counted and charged goes with the new copy. In this way, the method and system identify gaps in record keeping in order to ensure all data is properly maintained on the servers, its location is known and the storage space is efficiently utilized.

In aspects of the present invention, the method and system may be implemented as computer program products, computer systems and/or computing devices which provide a technical solution to a problem by automatically addressing storage utilization on servers within a cloud environment. The computer program products, computer systems and/or computing devices have broad applications in maintaining efficiency of storage usage amongst one or more servers.

This technical solution can be accomplished through the use of, amongst other features as described herein, blockchain technologies. Specifically, to efficiently manage storage space, specific aspects of the present invention use blockchain technologies to record any changes to storage utilization, and through, e.g., a smart contract, validate or post a time window for automated authorized removal and invoicing to a customer. Accordingly, it is now possible to use the blockchain technologies to record transactions that have occurred on one or more servers.

By way of non-limiting illustration, when a new resource is used or block requested, the blockchain technology is triggered to provide storage resources to enforce a transaction, i.e., maintain records of the transaction. These transactions may include, for example, reallocation of storage resources, deletion of data in storage, renaming of configuration files, etc. Accordingly, by use of the blockchain technology, it is possible to have a centralized authority for maintaining and tracking storage volume on one or more servers, including recording changes of data retention and data deletion due to decommissioning of servers, changes in retention policies, backup policies, etc. Also, the blockchain technology implemented herein provides storage information to different users, including a developer, tester, production team, or other third parties that are using the storage. Also, the blockchain technology enforces discipline that is lacking in resource blocking, maintains proper ownership in data retention, and uses and releases storage resources that need not be held in the data storage systems, e.g., servers. This allows on demand storage usage by freeing up resources that would otherwise be improperly utilized.

The method and system further include a push reporting mechanism for the utilized storage. For example, the push reporting mechanism provides notices to a service provider, indicating amongst other things, low value storage by users, storage utilization, changes to policies, etc. In addition, the smart contracts are defined to enable automated authorized deletion to free space based on different trade-offs. Moreover, the smart contracts include a bid mechanism which can free storage blocks at both high cost and low cost ends and leverage on-demand needs.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
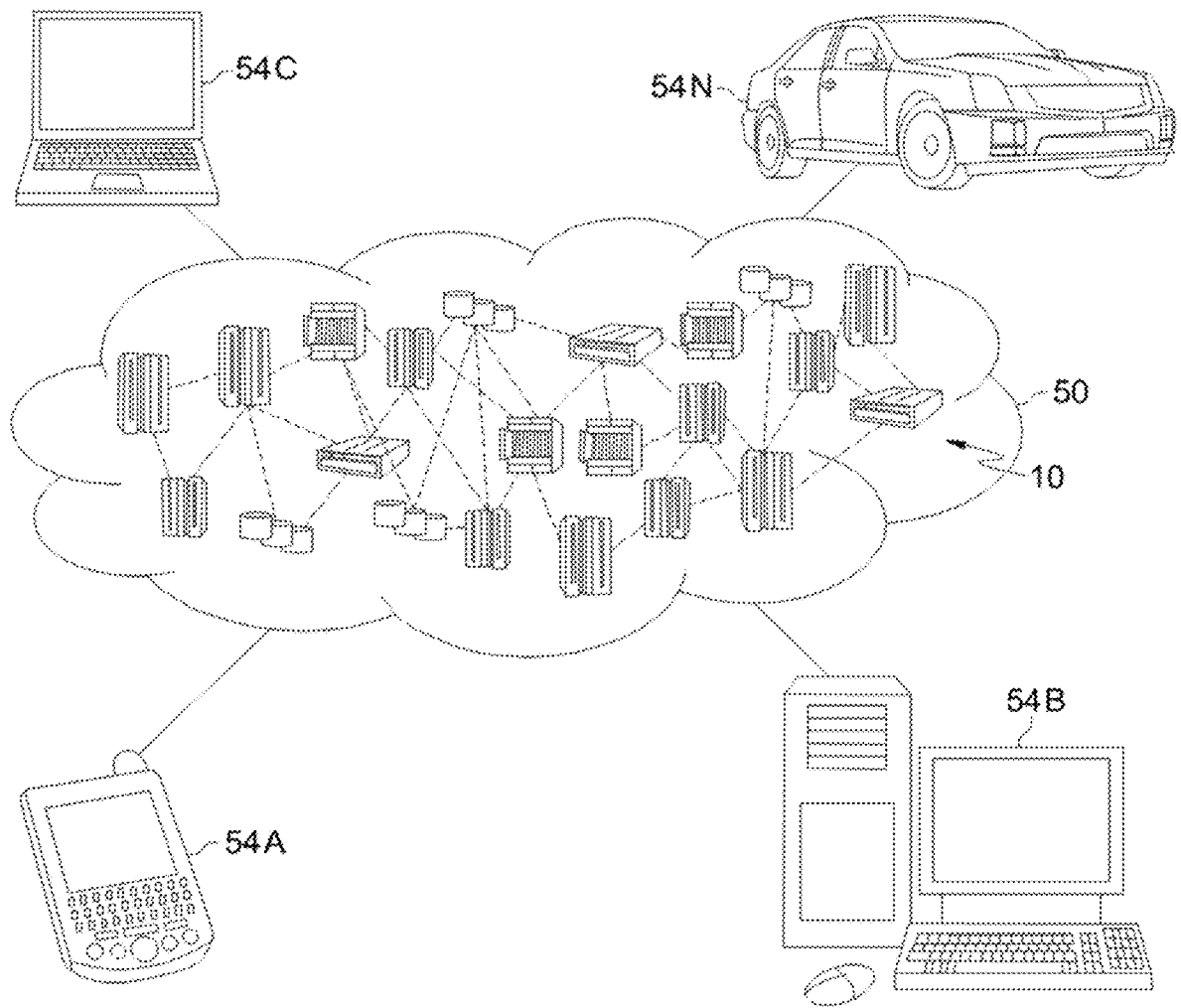
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
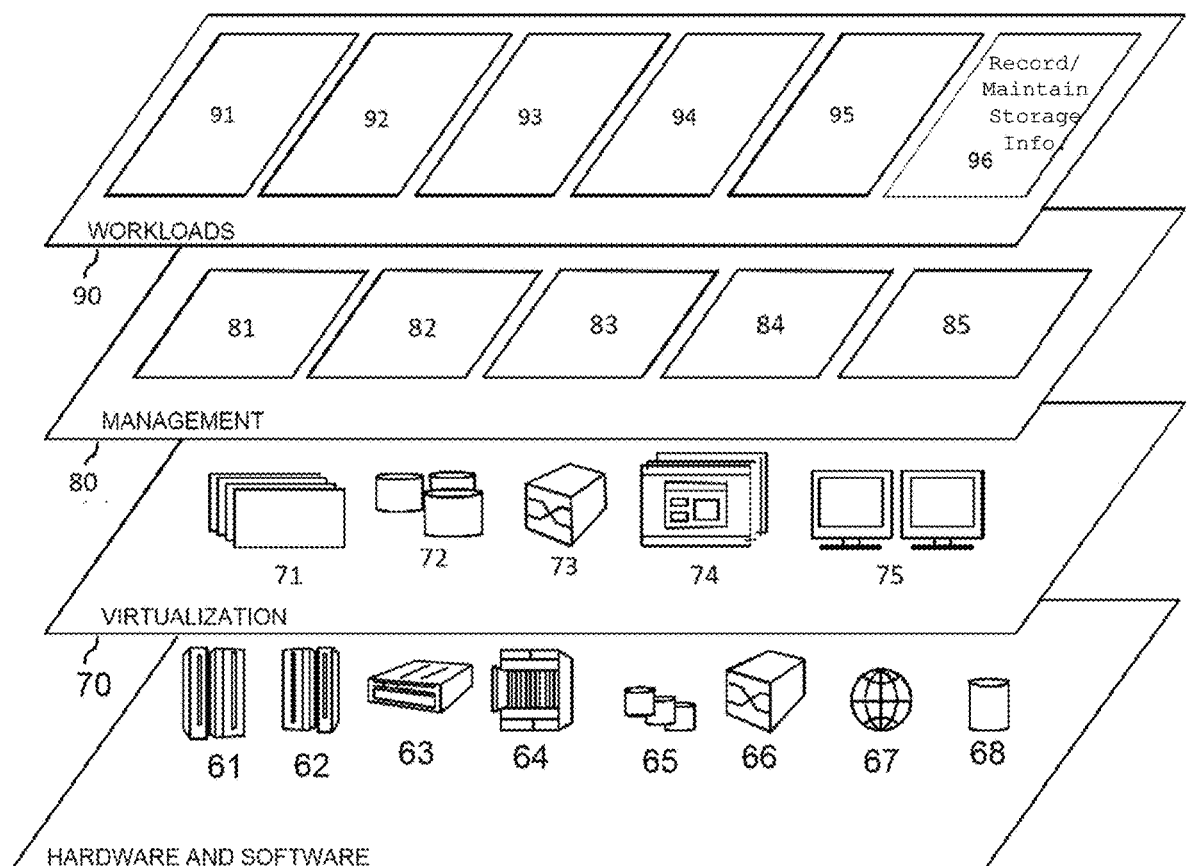
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recording and maintaining data storage information 96.

Implementations of the invention may include a computer system/server 12 of FIG. 1 in which one or more of the program modules 42 are configured to perform (or cause the computer system/server 12 to perform) one of more functions of the recording and maintaining data storage information 96 of FIG. 3. For example, the one or more of the program modules 42 may be configured to:

(i) provide common storage record keeping for databases and file levels;
(ii) provide transparency of all storage transactions and utilization;
(iii) maintain a listing of all storage stakeholders;
(iv) provide uniform record keeping for internal and external usage purpose;
(v) provide inclusion of untagged storage due to decommission of servers, changes in backup policy, changes in nomenclatures (e.g., .OLD, etc.), changes in contract gaps, etc.;
(vi) provide improved storage volume reporting with more accuracy for invoicing teams; and/or
(vii) provide up to date and readily available information for audit purpose.

Figure 4:
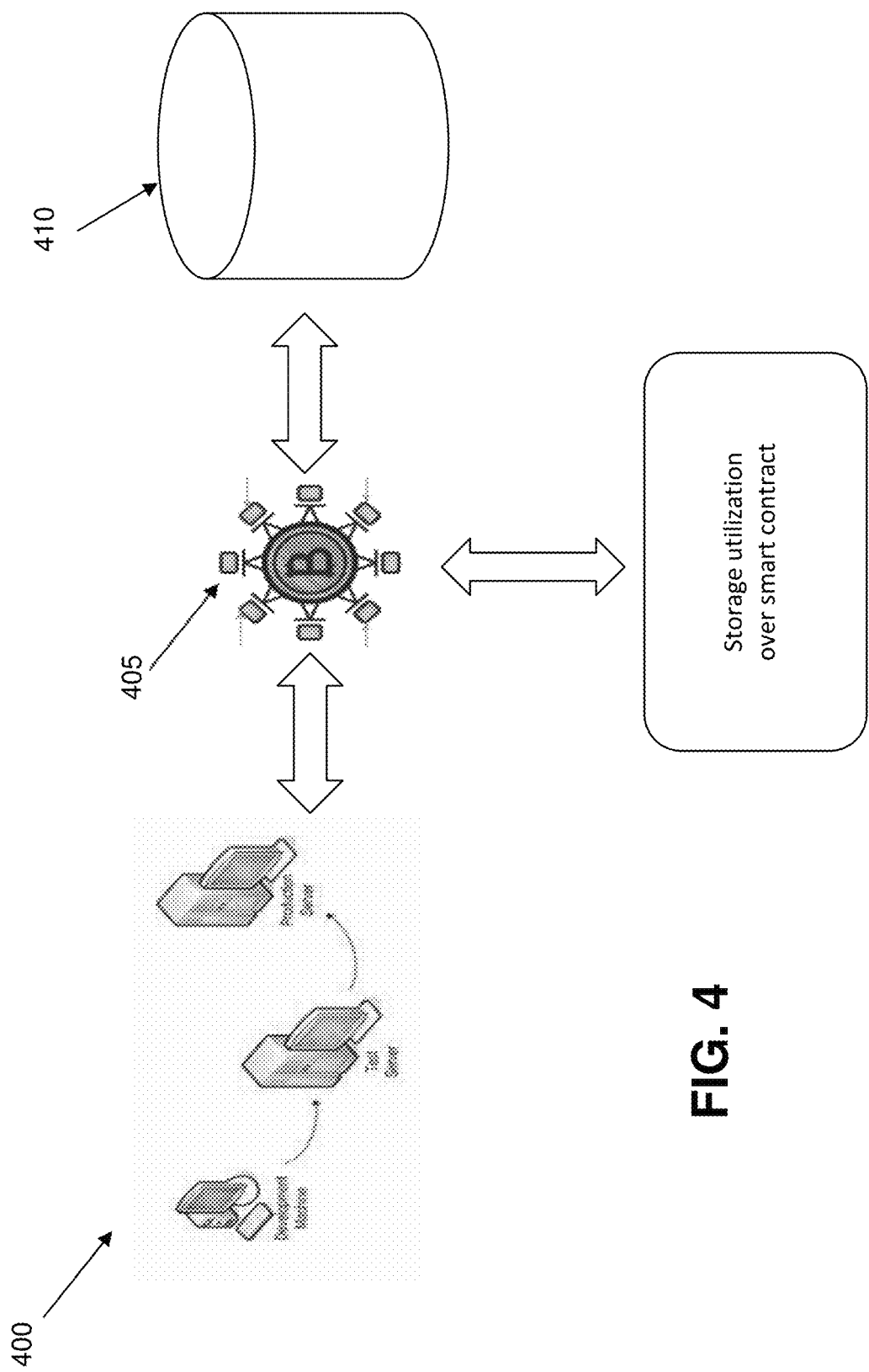
FIG. 4 shows a block diagram of an exemplary environment in accordance with aspects of the invention.

FIG. 4 shows a block diagram of an exemplary environment in accordance with aspects of the invention. In embodiments, the environment includes a plurality of diverse platforms (e.g., servers) 400, a blockchain module 405 and data center storage 410. In embodiments, the plurality of diverse servers 400 may include, e.g., development servers, test severs, production servers, internal or external servers, social media servers, etc., each of which store their data on a database, e.g., within the datacenter storage 410. In embodiments, the data center storage 410 may be a third party service provider which services one or more data storage systems, e.g., databases storing any type of data from the servers. For example, the data stored on one or more data storage systems may include pictures, texts, website content, social media content, music, videos, emails, program applications, etc.

The blockchain module 405 is a solution based around smart contracts with available storage and configurable items in place. In embodiments, the blockchain module 405 is configurable for use with any platform that is utilizing storage, e.g., plurality of diverse servers 400 and data center storage 410. The blockchain module 405 is preferably administered by the third party service provider, which may be the same or different than the third party service provider servicing the data center storage 410. The blockchain module 405 comprises one or more program modules such as program modules 42 described with respect to FIG. 1. The blockchain module 405 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the blockchain module 405 collects information of any transaction occurring on the data center storage 410 together in groups, known as "blocks". The blocks, when filled, are closed and linked to the previously filled block, forming a chain of data in chronological order. The blocks thus hold batches of valid transactions that are hashed and encoded, with each block including a cryptographic hash of the prior block in the blockchain, linking the two. The linked blocks form a chain. This iterative process confirms the integrity of the previous block, all the way back to the initial block. All new information that follows the previously added block is compiled into a newly formed block that is added to the chain, akin to ledger entries. In this way, the blockchain module 405 uses a data structure that inherently makes an irreversible timeline of data of all transaction when implemented in a centralized nature, and allows information to be recorded and distributed, but not edited. That is, when a block is filled with a particular transaction, e.g., related to the data storage, it is set and becomes immutable. In this way, the records of transactions cannot be altered, deleted, or destroyed. Also, each block in the chain is given an exact timestamp when it is added to the chain, which are linked together via cryptography.

Still referring to FIG. 4, the blockchain module 405 is a distributed database shared among the nodes of a computer network such as the data center storage 410 and plurality of diverse servers 400. The blockchain module 405 stores information electronically in digital format, while maintaining a secure and centralized record of transactions. The information includes, amongst others, any transaction that occurs in the data center storage 410 or requests by the plurality of diverse servers 400 which may affect data stored in the data center storage 410, regardless of the backup tools, types of diverse servers 400 or databases within the data center storage 410, or other technologies.

More specifically, the information recorded by the blockchain module 405 may include any changes to storage utilization, for example, but not limited to:
 (i) reallocating of storage resources including the deletion or addition of data stored in the data center storage 410;
 (ii) making a copy of data for backout;
 (iii) renaming of a data block, configuration file, etc., including changes in nomenclatures (e.g., .OLD, etc.);
 (iv) recording transactions that have occurred on or requested by any of the diverse servers 400 including new contacts, revised contracts, termination of contracts, etc.
 (v) recording and maintaining proper ownership in data retention in the data center storage 410, i.e., maintaining a listing of all storage stakeholders;
 (vi) recording changes of data retention and data deletion due to decommissioning of servers, changes in retention policies, backup policies, changes in contract gaps, etc.;
 (vii) recording any use and release of storage resources that need not be held in the data center storage 410; and/or
 (viii) recording any changes in a storage block (e.g., file, data base, log, etc.) which may result in uncoupling of the data, e.g., due to a full name change as MACD changes are carried out.

Accordingly, the blockchain module 405 records all transactions that occur between the data center storage 410 and plurality of diverse servers 400, any changes made to data in the data center storage 410 or any changes to contractual obligations made by any party related to data storage in the data center storage 410. This, in and of itself, will optimize resources by knowing what data is to be retained and what data is to be deleted, and any changes that are made to any of the obligations of the parties as it relates to the data.

Moreover, the blockchain module 405 provides storage information to different users, e.g., the plurality of diverse servers 400 including a developer, tester, production team, or others that are using the storage. This feature provides transparency of all storage transactions and utilization to all of the stakeholders. In addition, the blockchain module 405 provides common storage record keeping, in addition to providing uniform record keeping for internal and external usage purposes. In this way, the blockchain module 405 provides improved storage volume reporting with more accuracy for invoicing, which is updated regularly (e.g., in real-time) and consistently for audit purposes or other reasons. Also, the blockchain module 405 identifies gaps in record keeping in order to ensure all data is properly maintained on the servers, its location is known and the storage space is optimally utilized.

In further embodiments, the blockchain module 405 provides, e.g., publishes, smart contracts to any of the plurality of diverse servers 400. The smart contract is an offer for sale, providing a detailed listing and cost structure of any available resources in the data center storage 410. The smart contract also allows for a bidding process between any of the users of the plurality of diverse servers 400 and the service provider of the data center storage 410 as it relates to data storage, retention, backup policies, etc., based on the above recorded transactions by the blockchain module 405. More specifically, the available resources are provided by the blockchain module 405 as this module knows the available resources and ownership of data in the data center storage 410.

The smart contact can be partially or fully executed (and enforced) without human interaction using the recorded information provided by the blockchain module 405. The smart contract is also recorded in the blockchain module 405, available to any third party. The third party reviews the contract and selects, revises or bids for certain provisions which they desire to enter into with the data center storage 410. These provisions include, amongst other features, retention policies, data storage volume, recording activities, billing activities, time period of contact, etc. Once entered into, the smart contact is recorded in the blockchain module 405, which now knows what additional resources, etc., are being utilized, who owns the resources, e.g., data used in the data center storage 410, and what additional resources remain available. This additional information can be used to update, in real-time, the smart contact, as well as be used to service the data center storage 410 (e.g., decommission servers, backup data, retention policies, etc.) based on the contact provisions.

Figure 5:
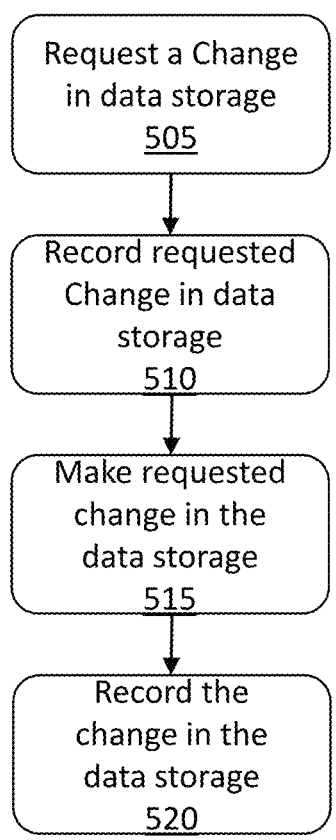
FIG. 5 shows a flowchart of an exemplary method in accordance with aspects of the invention.

FIG. 5 shows a flowchart of an exemplary method in accordance with aspects of the present invention. The steps of the method may be carried out in the environment of FIG. 1 and are described with reference to elements depicted in FIG. 4. At step 505, the system receives a request to make a change in the data storage system. This change may be from one or more of the diverse servers 400. The request includes, for example, removal of data, a contractual change in any data retention policy, a backup of data, etc. At step 510, the request is recorded in the blockchain module 405. At step 515, the specified change is made in the data storage system. At step 520, any changes to the data storage system are recorded by the blockchain module 405. It should be understood by those of skill in the art that at step 505, the change can be initiated and made by the data storage system, which would be recorded directly at step 515. These changes can be renaming of files, deletion of files, decommissioning of servers, etc. It should further be understood that any of the recorded changes can be used to automatically generate a smart contact which includes any of the updated resources as already described herein. Also, any of the changes can be pushed through a reporting mechanism to provide notices from or to a service provider, indicating amongst other things, low value storage by users, storage utilization, changes to policies, etc.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   detecting, by a computing device, a plurality of transactions on one or more data storage system, wherein the plurality of transactions includes a decommissioning of a server;
   generating, by the computing device, a smart contract based on previous transactions performed, the smart contract enabling automated authorized deletion of data on a decommissioned server;
   deleting, by the computing device, the data that was on the decommissioned server;
   sequentially recording, by the computing device, the plurality of transactions occurring on the one or more data storage system in sequentially linked and immutable blocks; and
   providing a bid mechanism from a smart contract for reciprocal benefits for freeing a storage block at both high cost and low cost ends to leverage on-demand needs,
   wherein the smart contract comprises an offer for sale and a detailed listing and cost structure of available resources in a data center storage, storage provisions including retention policies, data storage volumes, recording activities, billing activities, and time period.

2. The method of claim 1, wherein the plurality of transactions includes a change of a backup policy and further comprising removing data that is associated with the change of the backup policy.

3. The method of claim 1, wherein the plurality of transactions includes a renaming of a data file and further comprising removing data that is associated with the renaming of the data file, generating a notice of the renaming of the data file, and communicating the notice to a service provider.

4. The method of claim 1, wherein the plurality of transactions includes a backout condition and further comprising removing data that is associated with the backout condition.

5. The method of claim 1, wherein the plurality of transactions includes an uncoupled storage block, and further comprising removing the uncoupled storage block.

6. The method of claim 1, wherein the plurality of transactions includes a reallocation of storage resources.

7. The method of claim 6, further comprising receiving a request to perform one or more transactions of the plurality of transactions and the recording includes recording the request and a change of data associated with the request, in sequential order.

8. The method of claim 1, wherein each block includes batches of hashed and encoded transactions and wherein each block includes a cryptographic hash of a prior block.

9. The method of claim 8, further comprising creating an irreversible timeline of data of the plurality of transactions, and distributing without an ability to edit the irreversible timeline of data of all the transactions.

10. The method of claim 1, further comprises recording ownership of data associated with the plurality of transactions.

11. The method of claim 1, further comprising generating an invoice to a customer based on the smart contract.

12. The method of claim 1, further comprising managing resources on the one or more data storage system based on the recorded plurality of transactions.

13. The method of claim 1, wherein the computing device includes software provided as a service in a cloud environment.

14. The method of claim 1, further comprising:
    identifying a gap in the sequentially linked and immutable blocks;
    recording the location of the gap; and
    optimizing storage space in the sequentially linked and immutable blocks based on the gap.

15. A computer program product comprising one or more computer readable storage media having program instructions collectively stored on the one or more computer readable storage media, the program instructions executable to:
    receive a request to make a transaction associated with data on one or more data storage system, wherein the transaction comprises renaming of a data file and removing data that is associated with the renaming of the data file;
    record the request in an immutable block;
    generate a smart contract based on previous transactions performed, the smart contract enabling automated authorization of the request;
    make a change to the one or more data storage system based on the requested transaction and the smart contract;
    record the change in a second immutable block that is linked sequentially to the immutable block; and
    provide notification of the recorded change to a third party,
    wherein the smart contract comprises an offer for sale and a detailed listing and cost structure of available resources in a data center storage of the one or more data storage system, storage provisions including retention policies, data storage volumes, recording activities, billing activities, and time period.

16. The computer program product of claim 15, wherein the transaction includes reallocating of storage resources.

17. The computer program product of claim 15, wherein the recording includes at least one of: transactions that have occurred on or requested by different servers; a new contact, a revised contract; a termination of contract; ownership in data retention; changes of data retention and data deletion due to decommissioning of servers; changes in retention policies; changes in backup policies; any use and release of storage resources that need not be held in the one or more data storage system; and changes in a storage block which result in uncoupling of data due to a full name change as MACD changes are carried out.

18. The computer program product of claim 15, further comprising pushing a notification to a third party that resources have been freed up on the one or more data storage system based on the transaction.

19. A system comprising:
   a processor, a computer readable memory, one or more computer readable storage media, and program instructions collectively stored on the one or more computer readable storage media, the program instructions executable to:
   record changes in immutable, sequentially linked blocks associated with a plurality of data storage systems, each of the immutable, sequentially linked blocks include a single transaction that is to take place on the plurality of data storage systems in a sequence in which they take place and are requested, wherein the transaction comprises renaming of a data file and removing data that is associated with the renaming of the data file;
   generate a smart contract enabling automated authorization of the single transaction in each of the sequentially linked blocks;
   provide notification of the recorded change including freed up resources on the plurality of data storage systems due to the changes;
   identify a gap in the immutable, sequentially linked blocks;
   record the location of the gap; and
   optimize storage space in the immutable, sequentially linked blocks based on the gap.

\* \* \* \* \*